United States Patent Office 2,762,679
Patented Sept. 11, 1956

2,762,679
WOOD STAIN CONTAINING DEXTRAN DYE

Harry A. Toulmin, Jr., Dayton, Ohio, assignor to The Commonwealth Engineering Company of Ohio, Dayton, Ohio, a corporation of Ohio No Drawing. Application June 3, 1952,
Serial No. 291,561

1 Claim. (Cl. 8—6.5)

This invention relates to stains, especially stains for use on wood and to compositions for use in staining wood articles and the like, as well as methods for staining such articles.

The art of wood staining in the past has made use of dyes which were dissolved or dispersed in water or organic solvents and the like diluents so as to make the same applicable for applying as a spray, dip, or by brush. The water soluble stains generally consisted of an aqueous solution of an aniline dye, and were applied by brushing the same on to the wood surface to be stained. Such water stains, however, exhibit the very undesirable effect of raising the grain of the wood. This raising of the grain necessitates that the surface be sanded or otherwise treated to render it smooth.

The grain raising effect of such water soluble stains also makes it necessary to apply a sealer coating such as shellac to the stained wood in order to stiffen the fibers of the wood so that the surface can be uniformly sanded. When an open-grain wood is used, it is necessary, after the sanding operation, to apply a filler to the surface over which is then applied a varnish, lacquer or other desired coating.

The non-aqueous stains, for example, oil stains and spirit stains, and which generally consist of an aniline dye or aniline dye base dissolved in an organic solvent such as a hydrocarbon or alcohol, have been extensively used and have certain advantages over water stains. They also have certain undesirable features.

Stains containing highly volatile hydrocarbons, such as benzol, toluol or the like petroleum distillates, when applied to the wood surfaces of close grained structure, tend to leave the pores of the wood unimpregnated with the dye. Where such compositions are applied to a wood surface having open grain, it has been the practice after drying to treat the surface with a filler. Again, before applying the finish coating of varnish or lacquer, there must be applied a coating of shellac or similar functioning coating over either the stain or the filler in order to prevent "bleeding." This application of shellac or the like is necessary; otherwise, the solvents of the varnish or lacquer will penetrate into the stain and cause the color to "bleed" into the finish coat. The use of hydrocarbon solvents also is undesirable from the standpoint of fire hazard and the effect the volatile solvent may have on the operator applying the stain or dye composition.

The spirit stains, which generally utilize aniline dye bases treated so as to be soluble in alcohol, are not as useful as the water stains because they are subject to the disadvantage that such stains do not penetrate into the wood stains and they further lack permanency of the color and tend to fade in use, similar as the oil type stains. Spirit stains are also subject to the "bleeding" effect, and in many instancts, also produce the undesirable grain raising effect upon application of the stain to the wood surface.

In accordance with the present invention, a wood stain or dye is produced by combining the polysaccharides, known as dextrans, with aniline or aniline bases, and the resultant dye or coloring material formed is dispersed in water to form a wood staining composition. The dextran-aniline dye compound can be fixed in the cellulose pores of the wood and may be applied as a hot or cold solution. A hot aqueous solution of these dextranazo dyes as derived from these polysaccharides, being of the same general chemical class as starch or cellulose, form stains which are compatible with the wood so that a highly desirable staining effect is produced.

The aqueous staining solutions of this invention which comprise the aforementioned dextranazo dyes are preferably applied as a hot aqueous solution, although it is also effective for most woods when applied as a cold solution. Hot aqueous solutions of such dyes, when applied, penetrate into the wood and the solvent evaporates before the grain of the wood is caused to raise. Upon cooling, the dye is "set" in the wood and forms a relatively smooth uniformly stained wood surface. The thus stained surface is preferably sanded or otherwise treated to produce a desirable surface upon which a finish coating of varnish or lacquer may applied.

The optical brightness of these dextran-azo dyes may be further enhanced by the addition of one part to 1,000 to 10,000 parts of the dye of such modifiers as the umbelliferone compounds. If desired, substances may be added which are luminescent in sun light to increase the brilliancy of the color. Other compatible water soluble dyes or pigments also may be introduced in suitable amounts up to 10% of the weight of the dextran-azo dye to control the depth of the stain, grain development, and shade of the grain.

In particular, it is the object to either treat the wood before staining or treat the wood simultaneously with staining with so-called optical brighteners, sometimes called "bleaches," since these materials operate on the principle of converting ultraviolet or near ultraviolet light into a blue or near blue light. They serve as brighteners, whitening agents, optical bleaches and a screening agent for ultraviolet radiation. They have the capacity of fluorescence and are capable of masking the normal yellowish or brownish characteristics of cellulose and they have the capacity of producing contrasts between different colors and between different hues or shades thereby emphasizing the design as in the case of the grain of the wood as the grain of the wood reacts differently in color to stains and fillers than the remainder of the wood.

It has been a further problem to select these colorless dyes so that they would not conflict with the water-soluble aniline dyes of the non-grain-raising stains and, additionally, select these brighteners so they would not conflict with oil-soluble stains when they are used in wood stains.

It is an additional problem to find a brightener that will produce the unexpected property of being both substantive to the water-soluble aniline stains and to cellulose of the wood. It was found desirable to select the luminous activator that would work satisfactorily with wood, the wood stain, the filler and any lacquer sealer and gloss lacquer used in wood finishing and which would be undisturbed by the final rubbing and polishing operation of finishing wood.

Heretofore, in the art, the problem has been two-fold in connection with wood stains: first, the aging of the wood finish in sunlight causing it to darken and the wood grain to lose its definition, depth, etc. This eliminated the natural contrast between the grain and the rest of the wood and depreciated the appearance of the wood giving it a uniform dull, dark color. It has also been a problem in finishing wood not to over-finish it in that the multiple number of treatments such as filling, staining, sealing, lacquering, rubbing and polishing, while they built up, at the beginning of the life of the wood, a handsome apparance, yet, as the wood aged, these multiple coatings also aged and became dull, in turn dulling the finishes of the wood.

The present invention has as its object to maintain over a long period of life the original appearance of the wood as it was just after it was finished, as well as to enhance that appearance initially by brightening the finish, bringing out the grain of the wood and giving it that luminescent glow in sunlight that greatly enhances the beauty and quality of the wood.

It is also an object to place this brightening agent so that it will combine with the other dyes either when it had been put upon the wood and the wood is coated with these dyes to stain it or the brightening agent is put into the dye combination of the stain so that there is only one application. In either event, the result has been a marked improvement both in the initial appearance of the wood and in the subsequent life of the wood after finishing.

The optical brightening agents are usually water white and transparent and, therefore, have not interfered with the water soluble aniline dyes or oil soluble dyes used to stain the wood and they do not discolor the filler. When used they give the effect with the minimum of finishing operations of a highly finished piece of wood.

The optical brighteners which have been found useful are the coumarin derivatives, such as beta-methyl umbelliferone; the stilbene derivatives, derivatives of amino naphthalene and other brighteners that are colorless, fluorescent, direct dyestuffs with an affinity for cellulose. This gives to wood and wood stains an increased surface reflectance and a more brilliant surface than an untreated surface. Hydroxy coumarin; 1-naphthylamine-4-sulfonic acid, sodium 2-naphthylamine-6, 8-disulfonate; dibenzoylaminostilbene-sulfonic acid derivative; naphthalene; benzimidazoles, such as 2-styrylbenzimidazole or 1-(m-acetamido-2 benzimidazole)-2-(p-acetamidophenyl) ethylene; triazine condensation products; 2,2' ethylenebis (1-benzylbenzimidazole). For cellulose materials, the following have been found to be useful: o-alkoxy-benzoyl derivatives of 4,4'-diamino-stilbene-2,2'-disulfonic acid, optical; o-alhoxybenzoyl derivatives of 4,4'-diaminostilbene-2, and 2'-disulfonic acid.

We prefer b-methyl-umbelliferone which is a hydroxymethyl coumarin that is compatible with solvents, such as, isopropanol or acetone.

We also prefere styrylbenzimidazole. We have found useful 4 methyl, 7 diethylamine coumarin.

It will be understood in the following examples that by a substitution of the following brighteners and the use of the solvents particularly applying to those brighteners that such substitutions can be made in the examples. For instance, beta methyl umbelliferone is soluble in alcohols, ethers and esters and very slightly soluble in water. A typical product is that manufactured by Ciba known as "Uvitex" RS. Ciba also manufactures "Uvitex" WS, a beta methyl umbelliferone which is soluble in alcohols, ethers, lacquer thinners and water and "Uvitex" W concentrate which is soluble in ethers, acetates, alcohols, ring hydrocarbons, water ansd esters. We find that the General Dyestuff Company's "Blancophor" SC is a high concentrate styrylbenzimidazole which is soluble in ethers but very slightly soluble in alcohol. We have found that General Dyestuff Company's styrylbenzimidazole known as "Blancophor" R is very slightly soluble in ethers, alcohols and esters. We have found that General Dyestuff Company's "Floral OB" cc-o-124 and 7GA are successful. It is understood that "Floral OB," for instance, is a derivative of amino naphthalimid as covered by U. S. Patent No. 1,836,529.

In some instances the standard beta methyl umbelliferones may be precipitated in stain solutions. In such an event, when placed in their proper solvent, they can be used to treat the wood before staining. They are not used in the stain, filler or finishing coats, in that embodiment.

Amongst the most satisfactory of the foregoing types of compounds such as the umbelliferones is Uvitex WS or Uvitex RS manufactures by Ciba Company, Inc., or paper white RB manufactured by General Aniline and Film Corporation.

In accordance with the present invention, these dextranazo dyestuffs are obtained by coupling a diazotized aromatic amino compound, preferably one containing at least one substituted benzene nucleus or a naphthalene nucleus, with dextran such as derived from sucrose by the action of Leuconostoc organisms. The resultant dyestuffs, which are water soluble, are of particular value in compounding wool stains.

The following method of producing the dextran diazo dyes of this invention for use in preparing aqueous wood stains is given by way of illustration:

*Example I*

(1) To a slurry comprising 0.1 mol of aniline in water is added 0.25 mol of hydrochloric acid. The mixture is diluted with water and cooled to a temperature of between about 0–15° C.

While maintaining the temperature of the mixture at about 10° C. there is added slowly over a period of about 10 to 15 minutes a 0.1 mol sodium nitrite. The mixture is stirred slowly while maintaining the temperature at about 10° C. for one-half an hour.

(2) To effect the coupling reaction, a slurry comprising 0.1 mol of dextran in water is added 0.3 mol of sodium hydroxide. The mixture is diluted with water and cooled to between 5 and 10° C. Thereafter the diazo of (1) is stirred into the mixture over a 15 minute period while maintaining the temperature at about 10–15° C. and the pH of the solution above 9. After stirring the mixture for half an hour more the dextran-azo dyestuff is isolated by adjusting the pH of the solution to neutral with dilute hydrochloric and adding a salt, i. e., sodium chloride or sodium sulfate, until the dye precipitates from the solution. Thereafter the mixture is filtered to recover the dyestuff.

*Example II*

In this instance the dextran-azo dye is formed directly in the fermented culture media containing the polysaccharide by carrying out the coupling action by reacting diazotized aniline with the fermented culture media containing dextran.

*Example III*

In this example, aniline is diazotized in the usual manner and coupled with methylated dextran, and such as produced by reacting dextran with methyl sulphate and sodium hydroxide.

*Example IV*

Variations of dextran-azo dyestuffs are made by carrying out the coupling as described in Example I employing other amines or amino compounds in place of aniline, such as 1-naphthylamino-4 sulphonic acid, 2 amino 8 napthol sulfonic acid and p-nitroaniline.

Similarly variations of the dextran-azo dyestuffs are prepared by effecting a coupling action as described in Example I by utilizing various dextran derivatives such as described in the U. S. patents to G. L. Stahly et al., e. g. 2,203,702, 2,203,703, 2,203,704, 2,203,705 and U. S. Patent 2,344,190 to Waldie et al.

The invention broadly includes the preparation of wood staining compositions comprising a water-soluble dextran azo dyestuff containing the grouping

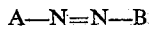

in which A represents the residue of an aromatic amino compound and B is a polysaccharide such as dextran or a derivative thereof as described above; N is nitrogen.

Varied shades of color may be produced with the dextran-azo dyestuffs, depending on the particular amine and polysaccharide used in compounding the dyestuff.

The following examples are exemplary of the specific wood staining compositions in accordance with the present invention:

*Example V*

A wood stain is prepared by dissolving the product of Example I in water to form a 10% solution. The resulting stain may be applied to wood by brushing or spraying.

Suitable amounts of the dyestuffs, as described in the above examples, are dissolved in water to provide a staining composition having the desired strength. The amount of dye utilized in a given case depends upon the particular dye employed, and its degree of concentration, and of course the depth of color required for the particular stain.

Additional solvent and vehicle ingredients may be added to the chosen dextran-azo dye (as described in the patent to Bush 2,000,121) to secure the particular properties desired in the final composition. In choosing such additional solvents or diluents or other vehicles, several factors should be kept in mind. The solvents or diluents or additional vehicles utilized should preferably be inexpensive enough to make them commercially practicable for the use in hand. They should be solvents of or miscible with the dextran dye dissolved in the penetrant vehicle component, and should be of such nature as to penetrate the wood and carry the dye into the wood. Further, the composition should desirably include a water eliminant in order to give the composition properties of resistance to moisture retention. Further, the combination of solvents or diluents or vehicles should be such that the final composition exhibits a proper evaporation curve to dispel both the diethylene-glycol mono-ethyl ether or other penetrant vehicle and any moisture present from the wood surface.

As illustrative of ingredients that may be utilized in order to increase the rapidity of drying and setting of the composition, the aliphatic alcohols, such as methyl alcohol, ketones, such as acetone, and the esters of the aliphatic alcohols, particularly the fatty acid esters of such materials, namely ethyl acetate, etc. may be utilized. Methyl alcohol or methanol is a particularly valuable ingredient for use in this connection.

Ingredients that give the composition resistance to moisture retention include hydrocarbon distillates, particularly the coal tar distillates, benzol, toluol, solvent naphtha, the xylols, ethyl benzene, etc. Toluol is valuable in this connection. Many of the esters, such as butyl propionate and butyl acetate are also exemplary of materials which have water eliminating properties, but such materials as these esters are slower drying and cost more, and therefore, are not as valuable in general in compositions of the present character as are the hydrocarbon substances, such as toluol. Both the aliphatic alcohols and similar ingredients and the hydrocarbon distillates and similar ingredients aid in the penetration and evaporation and other desirable effects above mentioned.

A modified wood staining composition may be made using composite solvents, such as follows, the parts being by weight:

| | Parts |
|---|---|
| Diethylene-glycol mono-ether | 1–5 |
| Methyl alcohol | 8–10 |
| Toluol | 4–6 |

This composition may be utilized with, for example, from 2 to 10 ounces of the particular dextran-azo dye to one gallon of the composite solvent. Diethylene-glycol mono-ethyl ether is a particularly good penetrant vehicle component and may be used with these dextran-azo dyes to produce a wood stain. Mono butyl ether of diethylene glycol may also be used for this purpose.

While for the production of stain compositions, particularly for treating wood surfaces, the compositions hereinabove described may be utilized, other ingredients may be added to the composition for particular purposes. For example, fillers, such as silex, or oil paste fillers, may be mixed with the new stain composition to make a combination stain and filler. A combination dextran-azo dye stain and filler having a color that is fast to light may, accordingly, be produced.

In addition, the dextran-azo dye stains produced in accordance with this disclosure, or the stain bases, may be added to or incorporated with cellulose ester or ether solutions and lacquers, as well as other lacquers, particularly those containing solvents of the nature of alcohols and hydrocarbons. In this way color dipping lacquers, the color of which is fast, may be produced. Various types of nitrocellulose compositions may, for example, be combined with the stain bases or compositions of the present invention.

In accordance with the present invention, it is possible for the first time to utilize such water-soluble polysaccharide azo dyes made by coupling dextran or the like polysaccharide derivative with aniline or other suitable diazotizing amino compound to form a water-soluble dye which yields, upon dispersion in an aqueous vehicle, a wood stain which is substantially fast to light, and exhibits non-fading, non-grain raising properties. A wood stain also is provided, which, when properly compounded and applied as described, does not tend to bleed through lacquer or varnish top finishing coats. Thus, the use of intermediate sealing coats is not necessary. Where desired, of course, intermediate sealing coats of suitable type may be employed.

It will be understood that while there have been described herein certain specific embodiments of this invention, it is not intended thereby to have it limited to or circumscribed by the specific details given in view of the fact that this invention is susceptible to various modifications and changes which come within the spirit of this disclosure and the scope of the appended claim.

Having thus set forth my invention, I claim:

A wood-staining composition comprising (a) a dyestuff having the general formula

in which A represents the residue of an aromatic amino compound selected from the group consisting of aniline, 1-naphthylamino-4-sulfonic acid, 2-amino-8-naphthol sulfonic acid and p-nitroaniline, B represents the dextran molecule, and N is nitrogen, and (b) a liquid vehicle for said dye consisting of, by weight, about 1 to 5 parts of diethylene glycol monoethyl ether, 8 to 10 parts of methanol and 4 to 6 parts of toluol, the dyestuff being present in the composition in an amount of 2 to 10 ounces per gallon of the vehicle.

References Cited in the file of this patent

UNITED STATES PATENTS

| 901,098 | Hall | Oct. 13, 1908 |
| 2,000,120 | Bush | May 7, 1935 |
| 2,130,783 | Sherrard et al. | Sept. 20, 1938 |
| 2,136,377 | Dinklage | Nov. 15, 1938 |
| 2,341,009 | Axelrod | Feb. 8, 1944 |

FOREIGN PATENTS

| 17,018 | Great Britain | 1909 |
| 105,119 | Great Britain | Apr. 3, 1917 |
| 560,143 | Great Britain | Mar. 22, 1944 |

OTHER REFERENCES

Scherer: "Rayon Textile Monthly," September 1944, page 123 (461).

Saunders: "The Aromatic Diazo Compounds," 2nd ed., 1949, p. 209.

Pitman et al.: "Carbohydrate Chemistry," 1948, page 513.